(12) United States Patent
Wong

(10) Patent No.: US 6,814,253 B2
(45) Date of Patent: Nov. 9, 2004

(54) INSULATING SLEEVE FOR GRASPING CONTAINER AND MANUFACTURING METHOD

(75) Inventor: Joseph Cheuk Mau Wong, Daly City, CA (US)

(73) Assignee: Double Team Inc., Daly City, CA (US)

( * ) Notice: Subject to any disclaimer, the term of this patent is extended or adjusted under 35 U.S.C. 154(b) by 18 days.

(21) Appl. No.: 10/271,810

(22) Filed: Oct. 15, 2002

(65) Prior Publication Data

US 2004/0070222 A1 Apr. 15, 2004

(51) Int. Cl.[7] .............................................. B65D 25/34
(52) U.S. Cl. ....................... 220/739; 220/903; 294/31.2
(58) Field of Search .............................. 294/27.1, 31.2; 229/402, 403; 220/738, 739, 753, 758, 903

(56) References Cited

U.S. PATENT DOCUMENTS

| | | | |
|---|---|---|---|
| 1,866,805 A | | 7/1932 | Haywood |
| 2,028,566 A | | 10/1936 | Seipel et al. |
| 3,473,682 A | * | 10/1969 | Studen ..................... 215/12.1 |
| 4,435,344 A | | 3/1984 | Iioka |
| 4,540,611 A | * | 9/1985 | Henderson ................... 428/12 |
| 4,708,254 A | * | 11/1987 | Byrns ........................ 215/13.1 |
| 5,067,922 A | * | 11/1991 | McMahon .................... 446/71 |
| 5,205,473 A | | 4/1993 | Coffin, Sr. |
| 5,425,497 A | | 6/1995 | Sorensen |
| 5,454,484 A | | 10/1995 | Chelossi |
| 5,490,631 A | | 2/1996 | Iioka et al. |
| 5,669,553 A | | 9/1997 | Smith |
| 5,713,512 A | * | 2/1998 | Barrett ......................... 229/403 |
| 5,826,786 A | | 10/1998 | Dickert |
| 6,138,902 A | * | 10/2000 | Welch .................... 229/103.11 |
| 6,152,363 A | | 11/2000 | Rule, Jr. |
| 6,158,612 A | | 12/2000 | Alpert |
| 6,164,487 A | * | 12/2000 | Hicks ......................... 220/739 |
| 6,182,855 B1 | | 2/2001 | Alpert |
| 6,265,040 B1 | | 7/2001 | Neale et al. |
| 6,308,883 B1 | | 10/2001 | Schmelzer et al. |
| 6,416,829 B2 | | 7/2002 | Breining et al. |
| 6,425,494 B1 | * | 7/2002 | Woods, II .................... 220/739 |
| 2002/0004110 A1 | | 1/2002 | Breining et al. |

OTHER PUBLICATIONS

Kinney, Gilbert Ford, "Engineering Properties and Applications of Plastics," 1957, 1st Ed., pp. 7–20.
Griff, Alan L., "Plastic Extrusion Technology," 1962, 2nd Ed., pp. 94–125.
Swanson, Robert S. "Plastics Technology," 1965, 1st Ed., pp. 37–38.
Pinner, S.H. (Editor), "Modern Packaging Films," 1967, 1st Ed., pp. 25–78.
Park, W.R.R. (Editor), "Plastics Film Technology," 1969, 1st Ed., pp. 7–9, 120–127.
Frank, H.P., "Polymer Monographs Volume 2 Polypropylene," 1968, 1st Ed., pp. 117–119.
Kresser, Theodore O.J., "Polyolefin Plastics," 1969, 1st Ed., pp. 138–141.
Steele, Gerald L., "Exploring the World of Plastics," 1977, 1st Ed., p. 24.
Braun, Dr. Dietrick, "Simple Methods for Identification of Plastics," 1982, 1st Ed., p. 67.

* cited by examiner

*Primary Examiner*—Dean J. Kramer
(74) *Attorney, Agent, or Firm*—Sawyer Law Group LLP

(57) ABSTRACT

An embodiment of the present invention is a sleeve, which facilitates the gripping of, and insulates the hand from, a hot or cold container. The sleeve comprises of sheet foam of a thick, opaque, plastic material that is suitable for snuggly fitting over the exterior surface of a container while permitting any pre-printed indicia on the sheet foam to be visible there through. The sleeve is opaque enough to cover any printing on the container itself. The foam is also available in a variety of forms such as anti-static, laminated, expanded and high or low density which provide different degrees of protection. Different density plastic foam and film material is used to achieve the opaque, thick, gripping and insulating effect for use with a variety of containers.

9 Claims, 2 Drawing Sheets

INSULATING SLEEVE FOR GRASPING CONTAINER AND MANUFACTURING METHOD

BACKGROUND OF INVENTION

1. Field of the Invention

The present invention is directed to a cup holder for use together with a container of hot or cold liquid to permit such individual to grasp comfortably and conveniently the exterior surface to such container. In addition, printed indicia are easily viewable on the cup holder itself.

2. Description of Prior Art

Holders are currently used for hot and cold beverage containers. Such holders are constructed out of cardboard, foam, and plastic material. Thick corrugated holders have been constructed out of such items but are too bulky, making it difficult to place them over cups and sometimes a waste of material. Many conventional holders are difficult to grasp because they are thin and consequently, susceptible to tearing. A thin holder does not provide much insulation for the container and could burn someone if the container is hot. In addition, such cup holders do not provide much resilience since they are thin. Furthermore, such cup holders are created to be only for "single-use" with a particular container. For instance, paper type material holders may get wet and therefore become damaged for any further use.

Many plastic holders are constructed out of a thin, translucent manner such that indicia already on the cup can be visible. Indicia must be pre-printed on a container in order for the public to recognize the indicia on the container. Because the plastic cup holder is so thin and translucent, indicia may not be printed on the cup holder or cup sleeve and may only be pre-printed on the container. It is thus inconvenient and more expensive for cups to have pre-printed indicia on the cup. In addition, there is insufficient insulation provided by such thin cup holders. Grasping hot drinks with such thin cup holders makes it very uncomfortable and even dangerous for the consumer's hands. Paper product cup sleeves such as cardboard cup sleeves do not provide much insulation either and heat from hot drinks penetrating through such cup sleeves tend to burn a consumer's hands or make it extremely uncomfortable.

It is therefore desirable to have a thick, opaque, non-translucent, polymer foam cup holder which has printed indicia on the interior or exterior of the cup sleeve that can be visible there from. At the same time, there is a need for such a cup holder that is not too bulky, attractive to the eye and functions to insulate the cup from being too cold or too hot for a user's hand.

SUMMARY OF INVENTION

The object of the present invention is to provide a holder for a container to permit an individual to easily grasp the exterior of a hot or cold container safely, and securely without the cup sleeve being susceptible to tearing. In addition, the present invention makes holding the container easy to use by providing flexibility, resilience and lightness. Furthermore, the cup holder provides high cushioning and compression strength which allows the holder to be used for repeated use applications.

The object of the invention is to provide a safe and secure cup sleeve which serves to insulate a hot or cold container with the indicia printed on the interior or exterior of cup sleeve. Consequently, this invention allows the sleeve to be tear-resistant, flexible, resilient, and easy to handle. The result of this invention is that it makes it easy and comfortable to use the cup sleeve.

The objects of the invention can be achieved by providing a sheet foam of a thick, opaque, polymer material that is suitable for snuggly fitting over the exterior surface of the container while permitting the pre-printed indicia on the sheet foam to be visible there through. The foam is also available in a variety forms such as anti-static, laminated, expanded and high or low density which provides different degrees of protection.

According to an embodiment of the present invention, the sleeve is comprised of two layers of polymer material laminated together whereby the sleeve has an inner layer to be placed in contact with the container and an outer layer to be placed in contact with a consumer's hand. The inner layer is constructed of a low density polymer foam material while the outer layer is constructed of a polymer film material permitting indicia to be printed on its surfaces.

In another embodiment of the present invention the outer layer of the sleeve is made of a polymer material that has a higher density than the low density polymer material used for the inner layer. Furthermore, other embodiments of the present invention disclose the low density polymer material is a low density polyethylene foam while the outer layer is constructed of high density polyethylene film. In yet another embodiment, the inner layer is constructed of low density polyethylene foam while the outer surface is constructed of a low density polyethylene film. The inner layer may be constructed of expanded polyethylene foam while the outer layer is made of high density polyethylene film, low density polyethylene film, linear low density polyethylene film or oriented polypropylene film.

According to another embodiment of the present invention, the sleeve has an inner layer and outer layer having a combined thickness of about 0.3 mm to 3.0 mm. Furthermore, an embodiment includes a fully assembled and ready to use sleeve. The sleeve may also have an upper end and lower end where the upper end has a diameter that is larger than a diameter of the lower end so that the sleeve may fit around a conically shaped container.

In another embodiment of the present invention, the sleeve may have a variety of textured patterns on the outer layer which may be created using a press. The texture may be a pattern of squares for example.

Furthermore, in accordance with an embodiment of the present invention, a method of manufacturing the container sleeve is disclosed whereby the method comprises a number of steps. The method disclosed comprises laying a sheet of polymer film material in a set position, this polymer film material has a outer surface and an inner surface; printing indicia and color on the outer surface or inner surface of the sheet of polymer film material which has a density allowing the indicia to remain on the outer or inner surface; laminating the inner surface of the sheet of polymer film material to a second sheet of low density polymer foam material resulting in a laminated material; the laminated material is exposed to high temperature to finish lamination; the laminated material is cut into large sheet; the large sheets are die cut into disassembled container sleeves, each sleeve having a first joint side and a second joint side; the joint sides are then attached to each other with forming a connected container sleeve; the container sleeve is then pressed resulting in a flattened sleeve with two creased ends.

The embodiments of the method of manufacturing the sleeve include using expanded polyethylene foam for the second sheet; or using high density polyethylene film, low density polyethylene film, linear low density polyethylene film or oriented polypropylene film for the initial first sheet of polymer film material. The container sleeve may be manufactured according to any of the mentioned embodiments.

These and other embodiments of the present invention are further made apparent, in the remainder of the present document, to those of ordinary skill in the art.

BRIEF DESCRIPTION OF DRAWINGS

These and other features, aspects and advantages of some embodiments of the present invention will become better understood with reference to the following description, appended claims and the accompanying drawings, which are not to be considered limitations in the scope of the invention, but are merely illustrative.

DETAILED DESCRIPTION OF SPECIFIC EMBODIMENTS

The description above and below and the drawings of the present document focus on one or more currently preferred embodiments of the present invention and also describe some exemplary optional features and/or alternative embodiments. The description and drawings are for the purpose of illustration and not limitation. Those of ordinary skill in the art would recognize variations, modifications, and alternatives. Such variations, modifications, and alternatives are also within the scope of the present invention. Section titles are terse and are for convenience only.

The following specific embodiments meet the need for a thick, opaque container sleeve which insulates the hand from hot and cold beverages very well and at the same time allows for enhanced grippability of such hot and cold beverage containers while providing indicia to be printed viewable on such sleeves. The embodiments are attractive and pleasing to the eye, in addition to being very lightweight, flexible, durable and easy to manufacture.

Figure 1:
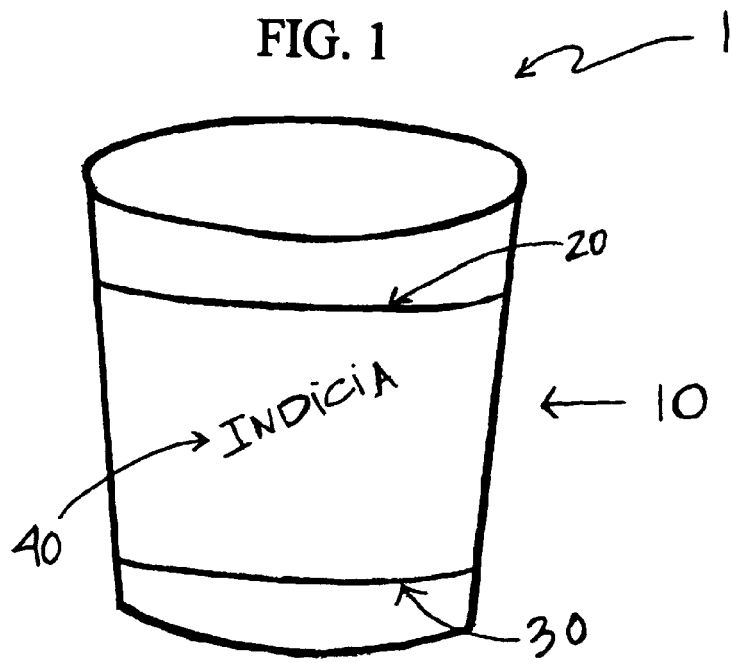
FIG. 1 is a perspective view illustrating an embodiment of the present invention when placed securely around a container.

As shown in FIG. 1, a typical container, in this case a cup 1, is shown with an embodiment of the present invention, the sleeve 10, engaged over the outside of the cup which enhances gripping and insulates the hand from the temperature of the cup. The sleeve 10, comprises of an upper end 20, and a lower end 30. The upper end 20 fits around an upper part of a container, as shown fitting around the upper part of the cup 1. The lower end 30 fits around the lower part of a container, as shown fitting around the lower part of the cup 1. The sleeve 10 may be constructed to display any type of indicia 40 or color on the sleeve 10 for a range of purposes such as advertisement.

Figure 2:
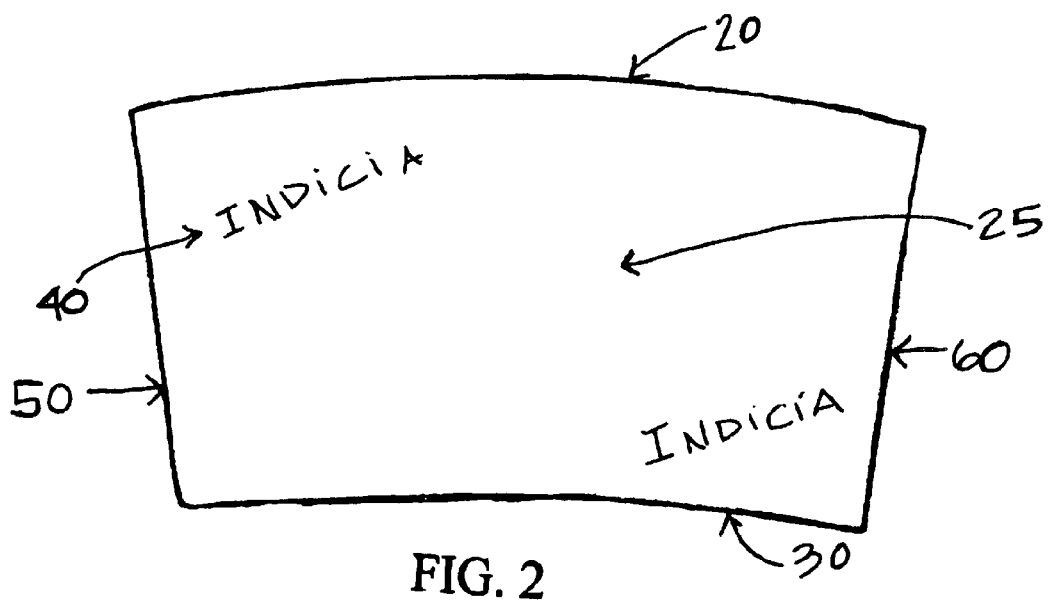
FIG. 2 is a side elevational view of an embodiment of the present invention.

FIG. 2, shows the same embodiment of the sleeve 10, in an assembled state and flattened for packing. As shown, the indicia 40 may be displayed on the sleeve 10 in any fashion and position. The embodiment shows two edges, a first edge 50 and a second edge 60 which may be pressed inwardly toward the center of the sleeve 10 to open the sleeve 10 in a position ready to envelop a cup 1 or other container. The embodiment further shows how the upper end 20 may have an upper end diameter that is larger than its lower end 30 diameter so that the sleeve 10 may fit securely around a cup-shaped or conical shaped container.

Figure 3:
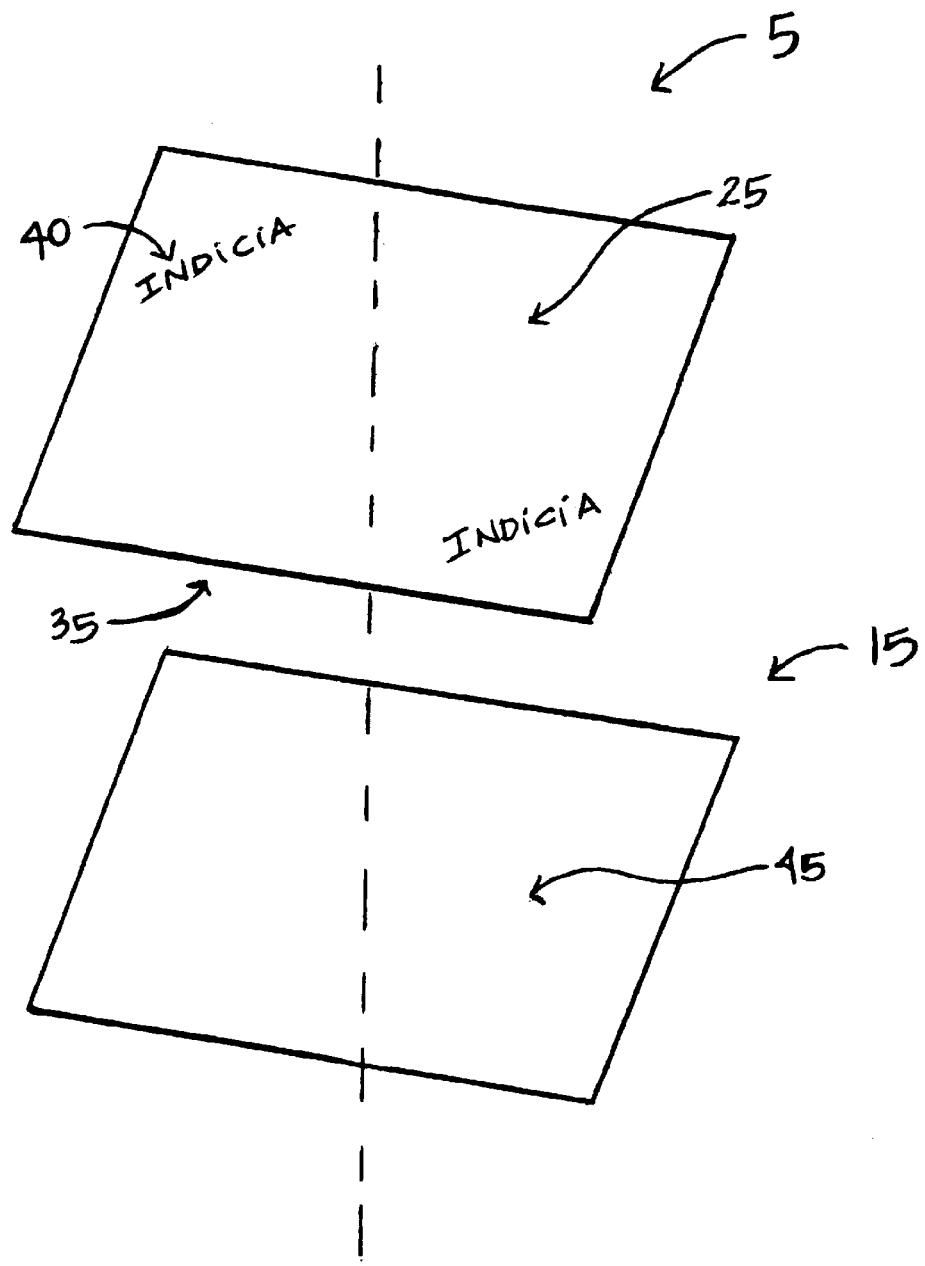
FIG. 3 is an exploded perspective view of an embodiment of the present invention.

According to FIG. 3, an embodiment is illustrated in exploded view to show two layers of the sleeve 10. The sleeve further comprises a first outer layer or first sheet 5 and a second inner layer or second sheet 15. The first outer layer 5 is the outside layer that is laminated over the second inner layer 15. The first outer layer 5 has both an outer surface 25, which is the side that comes into contact with a consumer's hand, and an inner surface 35 which contacts the second inner layer 15. The first outer layer 5 may be manufactured out of a variety of polymer film materials such as high density polyethylene film, low density polyethylene film, linear low density polyethylene film, oriented polypropylene film, other polyolefins and variations thereof.

In addition, the sleeve 10, further comprises the second inner layer 15 which is laminated to the inner surface 35 of the first outer layer 5. The second inner layer 15 comes into contact with the container or cup 1. This layer 15 may be manufactured out of a variety of polymer materials such as expanded polyethylene foam or other low density polymer material. This layer 15 in the preferred embodiment is typically constructed of a lower or equal density material than the first outer layer 5. In combination when laminated, the first outer layer 5 and the second inner layer may comprise a Polyethylene Foam with film such as oriented polypropylene film as the outer layer 5 with expanded polyethylene foam as layer 15, having very good elasticity and moisture proof characteristics. The sleeve 10 may also include an anti-static agent in the manufacture of the layer materials.

In a preferred embodiment, the sleeve 10 comprising of the first outer layer 5 and the second inner layer 15 may have a combined thickness of about 0.3 mm to 3.0 mm. This range may comfortably protect a consumer's hands by insulating it from the heat emitted from hot beverages.

The first outer layer 5 may further be marked with an indicia 40 for advertising or other marking purposes. Such indicia 40 may be imprinted on the outer surface 25 or the inner surface 35 of the first outer layer 5 using conventional printing techniques. When the sleeve 10 is in use with a container, the thickness of the combined layers is effective in blocking out any already existing markings or advertisements on the container itself. The thickness of the sleeve 10 creates an opaque effect and not a transparent one thereby allowing indicia 40 to be adequately visible on the sleeve 10 and further contributes to the comfort, feel, gripping and insulating features of the sleeve 10.

Furthermore, other embodiments of the present invention include the outer first layer 5 having a textured surface. Such textured surface may be created using a conventional press technique and result in a variety of textured designs or patterns such as a square pattern. This texture further enhances the comfort in gripping the sleeve 10 as well as the appearance of the sleeve 10.

In manufacturing the embodiment of the present invention, a first sheet 5 is positioned in a set position. The first sheet 5 has both an outer surface 25 and an inner surface 35. Indicia 40 is printed using any conventional printing techniques onto the outer surface 25 or inner surface 35 of the first sheet 5 which is constructed from a variety of plastic foam or film material such as polyolefins having a density to permit the indicia 40 to be retained on the outer surface 25 or the inner surface 35. Other colors and designs may be incorporated onto the outer surface 25 or inner surface 35 as well using a variety of printing processes.

The inner surface 35 of the first sheet 5 is next laminated using conventional lamination techniques to a second sheet 15. This second sheet is manufactured as discussed above from low density polymer foam material. The lamination may be done using a dry laminating machine. The laminated sheets are then exposed to high temperature to complete the lamination process.

As mentioned, the first sheet 5 may be manufactured out of variety of polymer materials such as high density polyethylene film, low density polyethylene film, linear low density polyethylene film, oriented polypropylene film and other polyolefins or variations thereof. The second sheet 15 may be manufactured from a variety of low density polymer materials such as expanded polyethylene foam. In combination, the sheets comprise the sleeve 10 that is opaque and thick enough to substantially obstruct any existing indicia on the container it envelopes.

Thereafter, the laminated sheets are then processed for cutting into large sheets prior to assembly. The large sheets are cut into the shape of predetermined disassembled sleeves for a variety of different containers. In a preferred embodiment, the sheets are cut using a die cutting machine; each disassembled sleeve has a first and second joint side. The disassembled sleeves are then connected at their respected joint sides. The first and second joint side are sealed together using conventional sealing techniques, in the preferred embodiment an impulse sealer is used to produce the connected sleeve 10 by creating the joint of the two sides. In other embodiments, the joining of the two sides may be accomplished using an adhesive. Furthermore, the sleeve 10 is then assembled after being pressed into a flattened sleeve ready for packing. Pressing the sleeve may be achieved using a machine press whereby the sleeve is flattened to have two creased ends one on a left side 50 and one on a right side 60 as shown in FIG. 2.

Throughout the description and drawings, example embodiments are given with reference to specific configurations. It will be appreciated by those of ordinary skill in the art that the present invention can be embodied in other specific forms. Those of ordinary skill in the art would be able to practice such other embodiments without undue experimentation. The scope of the present invention, for the purpose of the present patent document, is not limited merely to the specific example embodiments of the foregoing description, but rather is indicated by the appended claims. All changes that come within the meaning and range of equivalents within the claims are intended to be considered as being embraced within the spirit and scope of the claims.

What is claimed is:

1. A container sleeve for insulating and gripping a hot or cold container, comprising:
   a. an upper end;
   b. a lower end;
      wherein said upper end fits around an upper part of said container and said lower end fits around a lower part of said container;
   c. a first outer layer constructed of a polymer material permitting an indicia to be printed on said first outer layer, wherein said polymer material comprises high density polyethylene film; and
   d. a second inner layer constructed of a low density polymer material comprising a low density polyethylene material, whereby said second inner layer wraps around and contacts said container;
      wherein said second inner layer is laminated to said first outer layer resulting in an opaque container sleeve.

2. The container sleeve according to claim 1, whereby the container sleeve is fully assembled and ready for use.

3. The container sleeve according to claim 1, wherein the low density polymer material is an expanded polyethylene foam.

4. The container sleeve according to claim 3, wherein said expanded polyethylene foam and said high density polyethylene film have a combined thickness of about 0.3 mm to 3.0 mm.

5. The container sleeve according to claim 1, wherein said second inner layer and first outer layer have a combined thickness of about 0.3 mm to 3.0 mm.

6. The container sleeve according to claim 1, wherein said upper end has an upper end diameter and said lower end has a lower end diameter enabling the container sleeve to fit around a container and firmly grip said container.

7. The container sleeve according to claim 6, wherein said upper end diameter is larger than said lower end diameter enabling the container sleeve to fit around a conical shaped container and firmly grip said conical shaped container.

8. The container sleeve according to claim 1, wherein the first outer layer has a texture created by using a press.

9. A container sleeve for insulating and gripping a hot or cold container, comprising:
   a. an upper end;
   b. a lower end;
      wherein said upper end fits around an upper part of said container and said lower end fits around a lower part of said container;
   c. a first layer constructed of a polymer film material permitting an indicia to be printed on said first layer, wherein said polymer material comprises a high density polyethylene film; and
   d. a second layer constructed of a low density polymer material comprising a low density polyethylene material, whereby said second layer wraps around and contacts said container;
      wherein said second layer is laminated to said first layer resulting in an opaque container sleeve that is not transparent, which substantially obstructs any printing existing on the container.

* * * * *